United States Patent Office 3,465,117
Patented Sept. 2, 1969

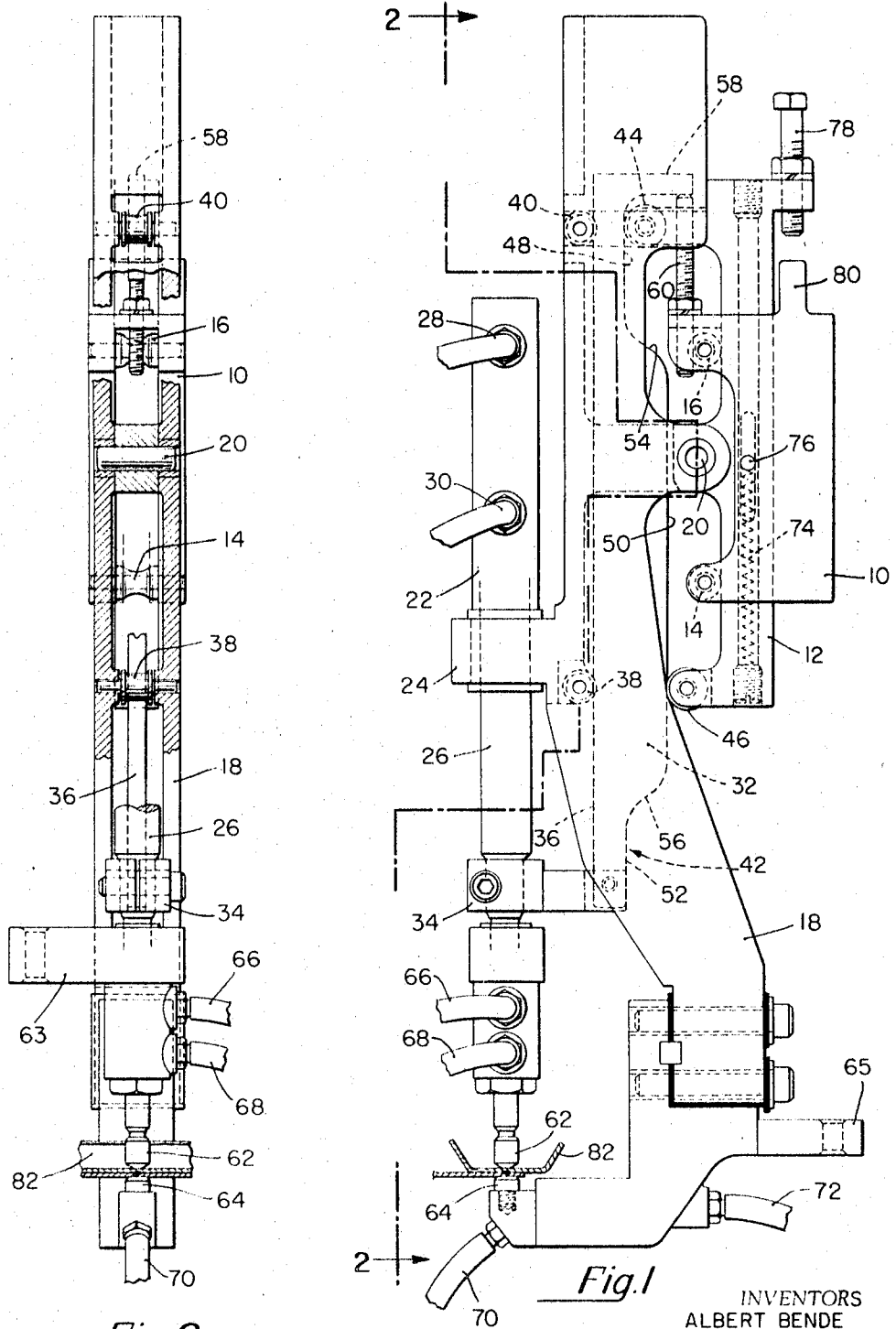

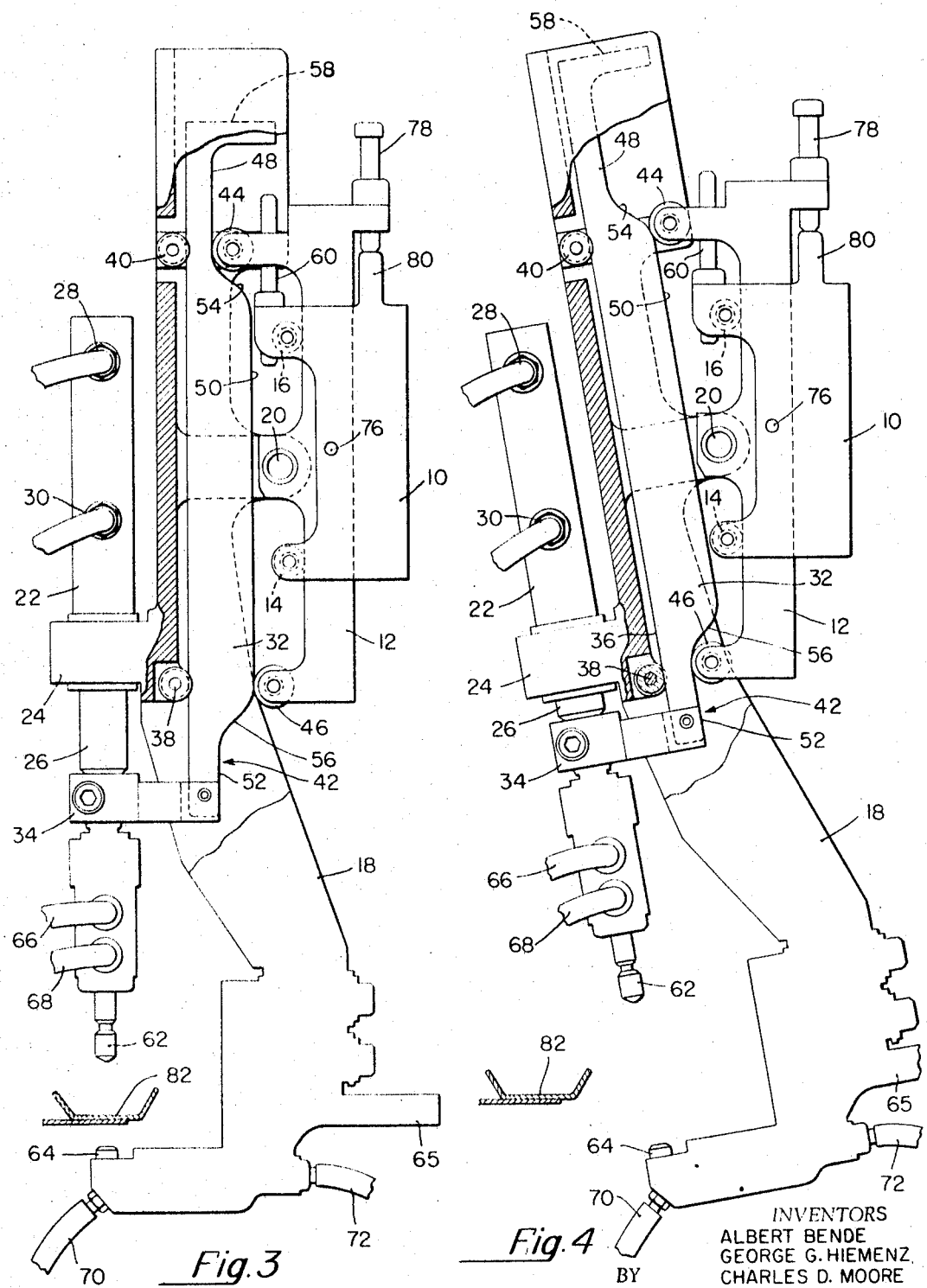

3,465,117
TILTING WELDING GUN
Albert Bende, Haddon Heights, N.J., George G. Hiemenz, Philadelphia, Pa., and Charles Dana Moore, Rowley, Mass., assignors of one-half to Goodrich Welding Equipment Corporation, a corporation of Michigan, and one-half to The Budd Company, a corporation of Pennsylvania
Filed Dec. 15, 1966, Ser. No. 601,958
Int. Cl. B23k 11/10, 37/02
U.S. Cl. 219—89                             11 Claims

ABSTRACT OF THE DISCLOSURE

A welding gun and supporting structure having cams and followers for swinging the welding gun between a stored position and a welding position. The hydraulic actuating means for moving the welding electrodes during the welding cycle is also utilized for moving the welding gun between the stored position and the welding position.

---

This invention relates to welding guns and more particularly to a welding gun movable between a welding position and a tilted or stored position.

In high production welding lines, it is common practice to have fixed welding guns into which metal parts are inserted by complicated transfer equipment for welding by reciprocal movement of a welding electrode and pressure applied thereto by a fluid actuated hydraulic cylinder. Another method employed, utilizes a movable welding gun controlled by an operator in which the metallic parts to be welded are rigidly secured in a fixture and the operator moves the gun into position and triggers the welding cycle of the gun when he has properly positioned the gun. The present methods require complicated transfer equipment and elaborate holding fixtures or a welding operator for each individual welding gun.

It is an object of this invention to provide a welding gun in which the hydraulic cylinder for moving the electrodes together for the welding cycle is utilized to move the welding gun in a compound motion between a welding position and a stored or tilted position thereby permitting straight line transfer of the assembly to be welded.

Another object of this invention is to provide an hydraulically actuated welding gun in which the hydraulic cylinder for actuating the welding gun is used to sequentially move the gun from a stored position into a welding position by the aid of compatible cycloidal cams conjugate cam followers, move the electrodes into contact with the object to be welded, apply pressure thereto during welding operation, and return the gun to its stored position.

A further object of this invention is to provide a cam bar having opposed cycloidal cams and conjugate cam followers for controlling the tilting of a welding gun between a stored position and a welding or working position wherein such movement is powered by a single hydraulic cylinder that may be assisted by a spring means.

These and other objects of this invention will become apaprent as reference is made to the following specification and drawing wherein:

FIG. 1 is a side view of a welding gun in welding position and tilting apparatus of the present invention.

FIG. 2 is a front view of a welding gun with sections broken away to show the cam bar, rollers and adjustment screws of the tilting apparatus.

FIG. 3 is side view of the novel welding gun with the gun in vertical position and the electrodes open with sections broken away to illustrate the position of the cam bar.

FIG. 4 is a side view of the novel welding gun in the stored or tilted position with section broken away to illustrate the position of the cam bar.

For purposes of explanation, the welding gun is to be considered in a vertical position with the top of the drawing being the uppermost portion of the welding gun.

Referring now to the drawings, as best seen in FIGS. 1 and 2, a mounting bracket 10 is secured to a fixed support, such as a wall. A guide bar 12 is slidably mounted in the mounting bracket 10 with rollers 14, 16 rotatably secured in the mounting bracket in contact with guide bar 12 for providing easy movement of the guide bar 12 relative to the mounting bracket 10.

The welding gun support frame or yoke 18 is pivotally secured to the guide bar 12 as by a pivot pin 20 or other suitable means for pivotal movement relative to the fixed mounting bracket 10 and guide bar 12.

A conventional double acting fluid pressure actuated drive cylinder 22 is secured to the yoke 18 as by a clamp bracket 24 or other suitable means. A drive rod 26 extends from the drive cylinder 22 and is connected to a piston (not shown) within the drive cylinder for reciprocal movement therewith. A pair of fluid connections 28, 30 connect a source of fluid under pressure to opposite sides of the piston for application of fluid under pressure to one of the sides of the piston upon command whereby the piston is moved within the cylinder and drives the drive rod 26 in reciprocal movements relative to the drive cylinder 22 in a conventional manner.

A cam bar 32 is secured to the drive rod 26 by a clamp 34 or other suitable means for translating movement therewith. The cam bar 32 is positioned within the yoke 18 with one plane surface 36 contacting a pair of rollers 38, 40 journaled in the yoke for reciprocating parallel movement relative to the yoke. A cam surface 42 is formed opposite surface 36 and is in contact with a pair of oscillating conjugate cam follower rollers 44, 46 journaled in the guide bar 12.

The cam surface 42 includes three surfaces 48, 50 and 52 that are parallel to each other and to surface 36. Surfaces 48 and 52 are in the same plane and therefore equidistance from surface 36. Surface 50 is connected to surfaces 48 and 52 by conjugate cam ramps 54, 56 respectively. The cam ramps 54, 56 are formed as cycloidal cams of compatible but oppoiste slope and are positioned in this embodiment so that roller 46 will be contacting ramp 56 at all times that roller 44 is contacting ramp 54. Such cycloidal cam surfaces provide a sinusoidal acceleration curve for the cam system. Further, when roller 44 is in contact with surface 48, roller 46 will be in contact with surface 50 and when roller 46 is in contact with surface 52, roller 44 will be contact with surface 50. Thus the cam follower rollers 44, 46 act as oscillating followers on a conjugate cam thereby eliminating the jump in the cam system which is experienced with a single cam and follower at the point of cross-over shock during acceleration reversal. By having one cam follower preloaded against the other backlash is eliminated and low noise, vibration, wear and excellent control of the followers result. A single polydyne cam and follower could be used but greater care and accuracy is needed in the machining and installation of such a cam system.

An arm 58 of cam bar 32 is positioned to contact an adjustable stop 60 secured to mounting bracket 10 for limiting movement of the cam 32 and drive rod 26 in one direction.

The welding gun consists of an upper electrode 62 having an arm 63 for connection to an electrical energy source and being secured to the drive rod 26 for movement therewith and a lower electrode 64 having an arm 65 for connection to an electrical energy source and being secured to the yoke 18 for movement therewith. Each electrode is watercooled in the conventional manner by water lines 66, 68 connected to the upper electrode 62 and water lines 70, 72 connected to the lower electrode 64. The electrodes 62, 64 are electrically insulated from the supporting structure by conventional means.

An assist spring 74 may be positioned in the guide bar 12 to bear against a pin 76 secured to the mounting bracket. The assist spring 74 is used to partially counterbalance the weight of the yoke when the welding gun is used in an inverted position from that shown in the FIGURES 1–4.

An adjustable screw 78 is attached to the guide bar 12 to contact a stop 80 on the mounting bracket 10 to limit movement of the yoke 18 and guide bar 12 in one direction.

In operation, with the welding gun in the stored position as seen in FIG. 4, fluid pressure is supplied to the drive cylinder 22 through supply port 28 exerting a downward pressure on the piston and thereby moving the drive rod 26 away from the cylinder 22. The cam bar 32 moves with the drive rod 26 on rollers 38, 40 contacting surface 36 and rollers 44, 46 moving over surfaces 50 and 52 respectively to the respective ramps 54, 56. As the roller 44 moves on ramp 54 from surface 50 to surface 48 and roller 46 moves on ramp 56 from surface 52 to surface 50, the yoke 18 is pivoted about pivot pin 20 to a vertical position as seen in FIG. 3. Further movement of the drive rod 26 moves the upper electrode 62 into contact with the material 82 to be welded as the arm 58 of cam bar 32 contacts the stop 60, thus limiting further movement of cam bar 32 and drive rod 26.

Continued application of fluid pressure through port 28 causes the cylinder 22 to move relative to the drive rod 26 whereby the yoke 18 and guide bar 12 are moved upwardly so that the adjustable screw 78 is moved from contact with stop 80 and the lower electrode 64 is moved upwardly into contact with the material 82 to be welded. With the electrodes in contact with the material 82 to be welded, conventional control means may be used to control the further application of pressure and current from the electrical energy source to effect the weld.

After the welding operation, the fluid pressure applied through port 28 to the piston is stopped and the spring 74 moves the yoke 18 and guide bar 12 downwardly together with fluid pressure applied to the opposite side of the piston through port 30 and exerts a downward thrust to the cylinder 22 until the adjustable screw 78 contacts stop 80. Such movement moves the lower electrode 64 from contact with the welded material 82. Further application of fluid pressure to the piston through port 30, produces an upward thrust to the piston causing the drive rod 26 to move upwardly into the cylinder 22. Such movement, moves the cam bar 32 upwardly with surface 36 in contact with rollers 38, 40 and roller 44 on surface 48 and roller 46 on surface 52. When rollers 44 and 46 move on their respective ramps 54 and 56 to the position shown in FIG. 4 the welding gun is tilted to the stored position.

Various degrees of tilt between the stored position and the welding position may be obtained by adjusting the followers and distance between the cam ramps.

While but one embodiment of this invention is described and illustrated, it is not intended to be limited by such arrangement and construction but by the prior art and the scope of the appended claims.

We claim:

1. A tilting welding gun having a welding position and a stored position and being movable therebetween, said gun including mounting means for supporting said gun on a fixed support, a support bracket movably supported on said mounting means, a pivotal connection on said support bracket, a yoke pivotally supported on said pivotal connection of said support bracket for pivotal movement between said stored position and said welding position, actuating means operably connected to and supported on said yoke for moving said yoke between said positions, cam means operably interconnecting said actuating means and said yoke for controlling movement of said yoke between said positions, first welding electrode secured to said yoke for movement therewith, a second welding electrode secured to said cam means and in alignment with said first electrode for movement theretoward by said actuating means, said first electrode being movable toward said second electrode by said actuating means when said yoke is in said welding position, a source of electrical energy operably connected to said electrodes, and control means for controlling said actuating means and electrical energy supplied to said electrodes for effectively welding a workpiece between said electrodes when said welding gun is in welding position.

2. The welding gun as claimed in claim 1 wherein said mounting means includes a first stop means for limiting movement of said support bracket in one direction.

3. The welding gun as claimed in claim 2 wherein said mounting means includes a second stop means for limiting movement of said cam means in one direction when said gun is in welding position.

4. The welding gun as claimed in claim 1 wherein said actuating means includes a cylinder secured to said yoke, and a drive rod operably connected to said cylinder for reciprocal movement relative thereto upon command, said cam means being secured to said drive rod for movement therewith.

5. The welding gun as claimed in claim 4 wherein said cam means is movably supported on said yoke for reciprocal movement relative thereto upon movement of said drive rod, a cam surface on said cam means, and cam follower means on said support bracket bearing on said cam surface of said cam means for moving said welding gun between said positions upon movement of said drive rod relative to said cylinder.

6. The welding gun as claimed in claim 4 wherein said cam means is movably supported on said yoke for reciprocal movement relative thereto upon movement of said drive rod, said cam means including a cam bar having a first cycloidal cam, and a second cycloidal cam; a pair of conjugate cam followers mounted on said support bracket, said conjugate cam followers having a first follower for contacting said first cam and a second follower for contacting said second cam.

7. The welding gun as claimed in claim 4 wherein said cam means is movably supported on said yoke for reciprocal movement relative thereto upon movement of said drive rod, said cam means including a cam bar having a first surface for movably supporting said cam bar on said yoke, a second surface parallel to and spaced from said first surface, a third surface parallel to said first surface and in the same plane as said second surface, a fourth surface parallel to said first surface, a first cycloidal cam connecting said second surface with said fourth surface, and a second cycloidal cam connecting said third surface with said fourth surface; a pair of conjugate cam followers mounted on said support bracket, said conjugate cam followers having a first follower positioned for contacting said second surface, said first cam and said fourth surface, and a second follower positioned for contacting said third surface, said second cam and said fourth surface; said conjugate cam follower and said cam bar being positioned so that in said welding position said first follower contacts said second surface when said second follower contacts said fourth surface, said first follower contacts said first cam when said second follower contacts said second cam during movement between said positions and in said stored position said first follower contacts said fourth surface when said second follower contacts said third surface.

8. In combination a welding gun and supporting apparatus including a mounting means secured to a fixed support, a support bracket supported for reciprocal movement on said mounting means, biasing means extending between said support bracket and said mounting means for biasing said support bracket in one direction, a first adjustable stop means for limiting movement of said support means in one direction, a yoke, a pivotal connection pivotally joining said yoke to said support bracket, an hydraulically actuated power cylinder having a drive rod mounted therein for reciprocal movement by application of fluid pressure thereto upon command, said cylinder being secured to said yoke for movement therewith, a cam bar secured to said drive rod for movement therewith and movably mounted on said yoke for reciprocal movement relative thereto, said cam bar including a first surface bearing on said yoke, a cam surface spaced from said first surface, and a stop arm; a second adjustable stop means on said mounting means for cooperating with said stop arm of said cam bar for limiting movement of said cam bar in one direction, cam follower means extending from said support bracket and contacting said cam surface for camming said yoke about said pivotal connection to desired positions of adjustment upon controlled movement of said cam bar, a first electrode secured to and electrically insulated from said drive rod, a second electrode secured to and electrically insulated from said yoke, said electrodes being aligned for reciprocal movement to and from engagement with a work piece positioned therebetween, a source of fluid under pressure, a source of electrical energy, a control means for controlling application of fluid pressure to said cylinder and application of electrical energy across said electrodes whereby a workpiece may be welded by application of pressure and electrical energy.

9. The apparatus as claimed in claim 8 wherein said cam surface includes a first cycloidal cam and a second cycloidal cam for cooperating with said cam follower means.

10. The apparatus as claimed in claim 9 wherein said cam follower means includes a pair of conjugate cam followers, a first cam follower contacting said first cam and a second cam follower contacting said second cam for eliminating backlash in the cam system and reducing wear thereto.

11. In a tilting welding gun having spaced welding heads movable relatively against and apart from an interposed work material, a mounting bracket, and a tiltable yoke assembly comprising a first electrode support, and a second electrode support, said first electrode support slidably mounted on said second electrode support for relative movement in a forward and back direction, a guide bar slidably in a forward and back direction on said mounting bracket and having a pivotal mounting thereon intermediate the ends thereof for pivotally supporting said second electrode support, a cam bar on said first electrode support having a cam surface and a support surface, and depending cam follower rollers on said guide bar at each side of said pivotal mounting for engaging said cam surface, and support rollers on said second electrode support for supporting said cam bar and said first electrode support on said second electrode support, said cam bar and follower connections between said guide bar and said first electrode support being actuated by a sliding movement of said first electrode support relative to said guide bar to tilt said yoke assembly relative to said guide bar and actuating means connected between said first and second electrode supports for relatively moving said supports to move the electrodes relatively toward and away from one another against opposite sides of said interposed work material and for tilting said support assembly with relation to said guide bar.

References Cited
UNITED STATES PATENTS

| 3,008,034 | 11/1961 | Wolfbauer et al. | 219—89 |
| 3,299,247 | 1/1967 | Waltonen | 219—89 |

JOSEPH V. TRUHE, Primary Examiner

L. H. BENDER, Assistant Examiner

U.S. Cl. X.R.

219—119